United States Patent
Tzeng et al.

(10) Patent No.: US 6,728,213 B1
(45) Date of Patent: Apr. 27, 2004

(54) SELECTIVE ADMISSION CONTROL IN A NETWORK DEVICE

(75) Inventors: Shr-Jie Tzeng, Fremont, CA (US); Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 201 days.

(21) Appl. No.: 09/814,815

(22) Filed: Mar. 23, 2001

(51) Int. Cl.[7] .......................... G01R 31/08; G06F 11/00
(52) U.S. Cl. ........................................ 370/235; 370/412
(58) Field of Search ................................. 370/229, 230, 370/230.1, 231, 232–235, 412, 413, 415, 428, 429, 395.4–395.43

(56) References Cited

U.S. PATENT DOCUMENTS

| | | | |
|---|---|---|---|
| 5,408,465 A | 4/1995 | Gusella et al. | 370/17 |
| 6,028,842 A * | 2/2000 | Chapman et al. | 370/235 |
| 6,246,680 B1 * | 6/2001 | Muller et al. | 370/389 |

FOREIGN PATENT DOCUMENTS

| | | |
|---|---|---|
| EP | 0932282 A2 * | 7/1999 |
| WO | WO 95/15636 | 6/1995 |
| WO | WO 00/75744 A2 | 12/2000 |

OTHER PUBLICATIONS

Yael Lapid et al.; Analysis of Discarding Policies in High–Speed Networks; IEEE Journal on Selected Areas in Communications; vol. 16; No. 5; Jun. 1998; pp. 764–777.

* cited by examiner

*Primary Examiner*—Wellington Chin
*Assistant Examiner*—Raj Jain
(74) *Attorney, Agent, or Firm*—Harrity & Snyder, LLP

(57) ABSTRACT

A network device that controls the communication of data frames between stations performs an admission control procedure to reduce congestion on the network device. The network device receives data frames on its receive ports. When the network device detects congestion, the network device enables admission control and reads a portion of a data frame to determine the nature of the data included in the data frame. The network device then determines whether to drop the received data frame based on the nature of the data included in the data frame. The network device may also determine a priority associated with the data frame and selectively drop data frames based on the nature of the data included in the data frame and the priority.

20 Claims, 8 Drawing Sheets

SELECTIVE ADMISSION CONTROL IN A NETWORK DEVICE

TECHNICAL FIELD

The present invention relates generally to network communications and, more particularly, to admission control in a network device.

BACKGROUND ART

In computer networks, a number of network stations are typically interconnected via a communications medium. For example, Ethernet 802.3 is a commonly used local area network (LAN) scheme in which multiple stations are connected to a shared or dedicated serial data path. These stations often communicate with a switch or some other network device located between the data path and the stations connected to that path. The switch typically controls the communication of data and includes logic for receiving and forwarding data frames to their appropriate destinations.

When all of the stations connected to the network are simultaneously operating and transmitting data at high speeds, data traffic on the switch may become heavy. Accordingly, some switches may drop data frames after a congestion condition is detected. In this case, the dropped data frames are not forwarded to their intended destinations. One drawback with conventional switches that drop data frames is that the switch randomly drops the data frames without determining the nature of the data in the respective data frames.

DISCLOSURE OF THE INVENTION

There exists a need for a mechanism in a network device that selectively drops data frames when a congestion condition exists. This and other needs are met by the present invention, where a multiport device receives a data frame and identifies the type of data included in the data frame. The multiport device then determines whether to perform admission control on the received data frame based on the availability of resources on the multiport device and the type of data included in the data frame.

According to one aspect of the invention, a network device that controls communication of data frames between stations is provided. The network device includes a plurality of receive ports configured to receive data frames from the stations. The network device also includes data frame processing logic that determines whether admission control is enabled. The data frame processing logic also determines whether to drop one of the received data frames based on whether admission control is enabled and information included in the received data frame.

Another aspect of the present invention provides a method in a network device that controls communication of data frames between stations. The method includes receiving data frames from the stations and determining whether a first received data frame is associated with establishing a connection between a first device and a second device. The method also includes dropping the first data frame when the first data frame is associated with establishing the connection.

Other advantages and features of the present invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation represent like elements throughout.

BEST MODE FOR CARRYING OUT THE INVENTION

The present invention will be described with the example of a switch in a packet switched network, such as an Ethernet (IEEE 802.3) network. It will become apparent, however, that the present invention is also applicable to other packet switched systems, as described in detail below, as well as to other types of systems in general.

Switch Architecture Overview

Figure 1:
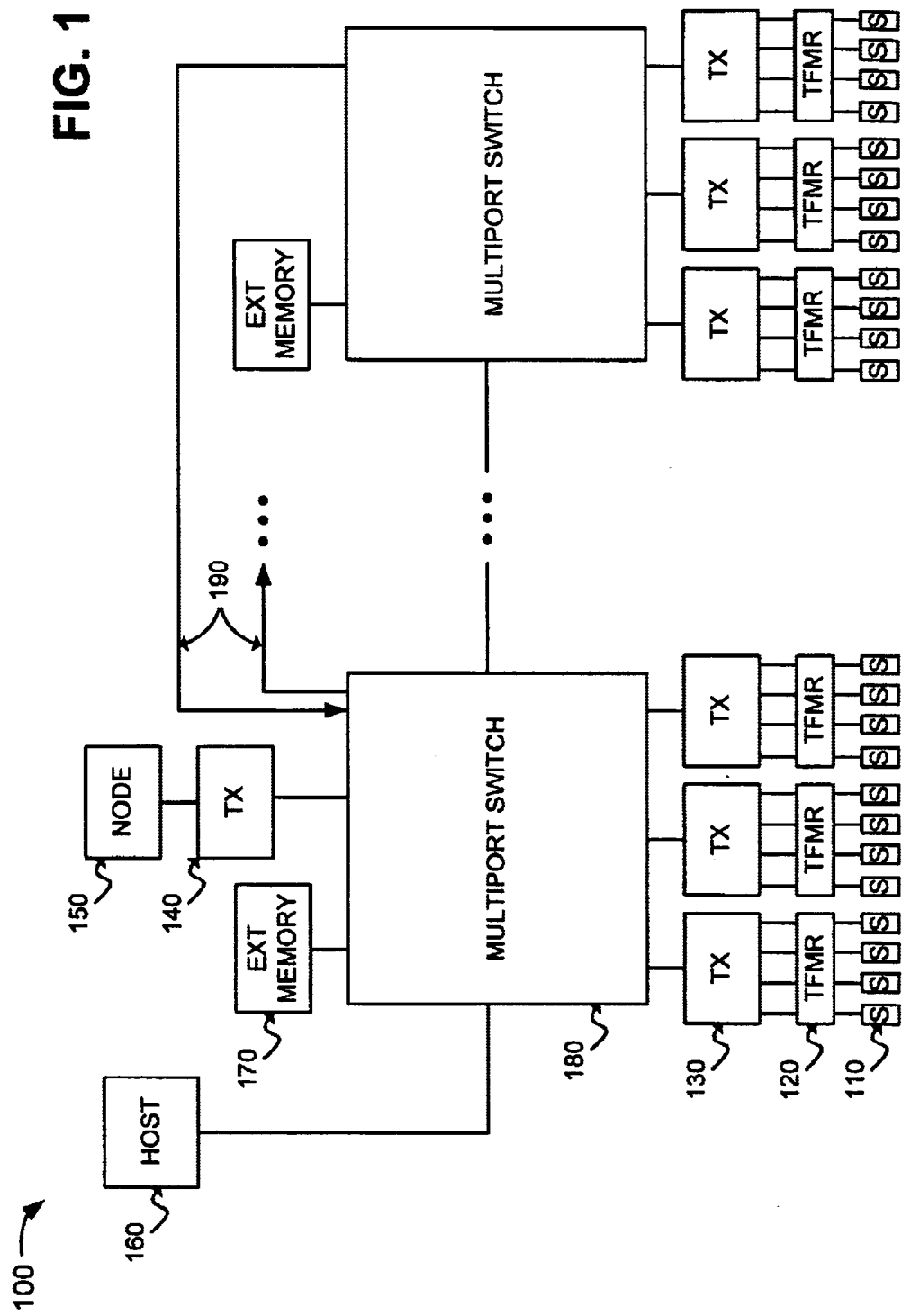
FIG. 1 is a block diagram of an exemplary system in which methods and systems consistent with the present invention may be implemented.

FIG. 1 is a block diagram of an exemplary system in which systems and methods consistent with the present invention may be implemented. The exemplary system may include a packet switched network 100, such as an Ethernet (IEEE 802.3) network. The packet switched network 100 may include network stations 110, transformers 120, transceivers 130 and 140, a network node 150, a host 160, external memories 170, and multiport switches 180. The network stations 110 may include conventional communication devices, such as computers, with different configurations. For example, the devices may send and receive data at network data rates of 10 megabits per second (Mb/s) or 100 Mb/s.

Each 10/100 Mb/s network station 110 may send and receive data to and from a multiport switch 180 according to either a half-duplex or full duplex Ethernet protocol. The Ethernet protocol ISO/IEC 8802-3 (ANSI/IEEE Std. 802.3, 1993 Ed.) defines a half-duplex media access mechanism that permits all stations 110 to access the network channel with equality. Traffic in a half-duplex environment may not be distinguished over the transmission medium. Rather, each half-duplex station 110 may include an Ethernet interface card that uses carrier-sense multiple access with collision detection (CSMA/CD) to listen for traffic on the transmission medium. The absence of network traffic is detected by sensing deassertion of a receive carrier on the transmission medium.

Any station 110 having data to send may attempt to access the channel by waiting a predetermined amount of time, known as the interpacket gap interval (IPG), after deassertion of the receive carrier on the transmission medium. If multiple stations 110 are connected to the same link, each of the stations 110 may attempt to transmit data in response to the sensed deassertion of the receive carrier and after the IPG interval, possibly resulting in a collision. Hence, the transmitting station 110 may monitor the transmission medium to determine if there has been a collision due to another station 110 sending data on the same link at the same time. If a collision is detected, both stations 110 cease transmitting, wait a random amount of time, and then retry the transmission.

The 10/100 Mb/s network stations 110 that operate in full duplex mode may send and receive data packets according to the Ethernet standard IEEE 802.3u. The full duplex environment provides a two-way, point-to-point communication link enabling simultaneous transmission and reception of data packets between each link partner (i.e., the 10/100 Mb/s network station 110 and the corresponding multiport switch 180).

The transformers 120 may include magnetic transformers that provide AC coupling between the network stations 110 and the transceivers 130. The transceivers 130 may include 10/100 Mb/s physical layer transceivers that communicate with the multiport switches 180 via respective serial media independent interfaces (SMIIs) or reduced media independent interfaces (RMIIs). Each of the transceivers 130 may be configured to send and receive data packets between the multiport switch 180 and up to four network stations 110 via the SMII/RMII. The SMII/RMII may operate at a data rate sufficient to enable simultaneous transmission and reception of data packets by each of the network stations 110 and the corresponding transceiver 130.

The transceiver 140 may include one or more 1000 Mb/s (i.e., 1 Gb/s) physical layer transceivers that provide communication with nodes, such as the network node 150, via, for example, a high speed network transmission medium. The network node 150 may include one or more 1 Gb/s network nodes that send and receive data packets at a network speed of 1 Gb/s. The network node 150 may include, for example, a server or a gateway to a high-speed backbone network.

The host 160 may include a computer device that provides external management functions to control the overall operation of the multiport switches 180. The external memories 170 may include synchronous static random access memories (SSRAMs) that provide external storage for the multiport switches 180. Each of the external memories 170 may include a Joint Electron Device Engineering Council (JEDEC) pipelined burst or Zero Bus Turnaround (ZBT) SSRAM having a 64-bit wide data path and a 17-bit wide address path. The external memories 170 may be addressable as upper and lower banks of 128K in 64-bit words. The size of the external memories 170 is preferably at least 1 Mbyte with data transfers possible on every clock cycle through pipelining.

The multiport switches 180 selectively forward data packets received from the network stations 110 or the network node 150 to the appropriate destination according to the appropriate transmission protocol, such as the Ethernet protocol. The multiport switches 180 may be cascaded together (via lines 190) to expand the capabilities of the multiport switches 180.

Figure 2:
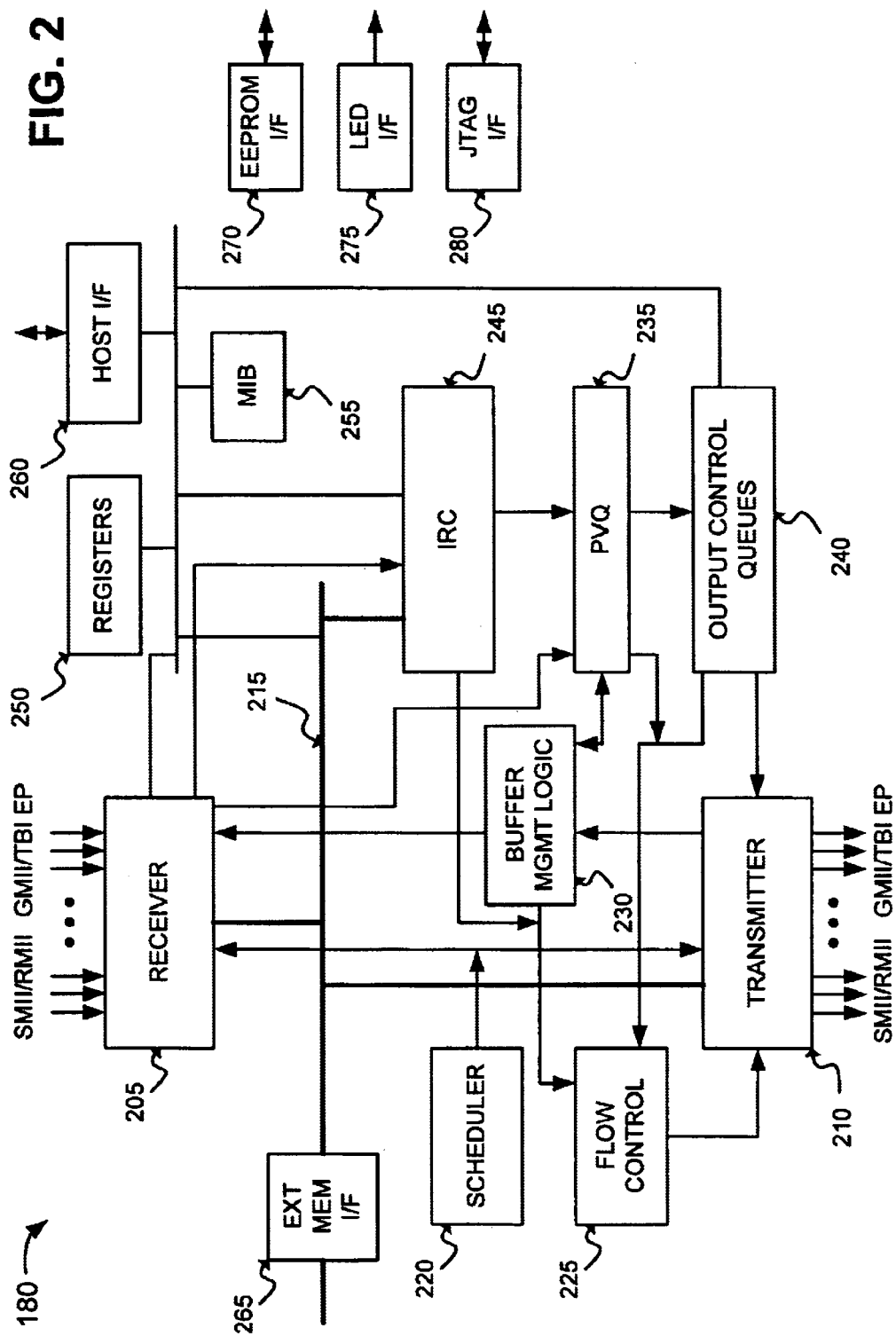
FIG. 2 is an exemplary detailed block diagram of the multiport switch of FIG. 1.

FIG. 2 is a detailed diagram of the multiport switch 180 according to an implementation consistent with the present invention. The multiport switch 180 may include a receiver 205, a transmitter 210, a data bus 215, a scheduler 220, flow control logic 225, buffer management logic 230, a port vector queue (PVQ) 235, output control queues 240, an internal rules checker (IRC) 245, registers 250, management information base (MIB) counters 255, a host interface 260, an external memory interface 265, an EEPROM interface 270, an LED interface 275, and a Joint Test Action Group (JTAG) interface 280.

The receiver 205 may include media access control (MAC) modules and receive buffers, such as first-in, first-out (FIFO) buffers. The receive modules may include input ports that support SMIIs, RMIIs, gigabit media independent interfaces (GMIIs), ten bit interfaces (TBIs), and proprietary interfaces for expansion with other multiport switches 180 (FIG. 1). The expansion ports (EPs) may be used to transfer data between other multiport switches 180 according to a prescribed protocol. The expansion ports may permit the multiport switches 180 to be cascaded together to form a backbone network. Each of the receive modules may include queuing logic that receives data packets from the network stations 110 and/or network node 150 and stores the packets in the corresponding receive FIFOs. The queuing logic may then send portions of the packets to the IRC 245 for processing and to the external memory 170 for storage via the external memory interface 265.

The transmitter 210 may include MAC modules and transmit buffers, such as FIFO buffers. The transmit modules may include output ports that support SMIIs, GMIIs, TBIs, and proprietary interfaces for expansion with other multiport switches 180. Each of the transmit modules may include dequeuing logic that obtains packets from the external memory 170 and stores the packets in the corresponding transmit FIFOs. The transmit modules may read the data packets from the corresponding transmit FIFOs and transmit the packets to the network stations 110 and/or network node 150. In an alternative implementation consistent with the present invention, the functions of the receiver 205 and transmitter 210 may be performed by a transceiver that manages both the receiving and transmitting of data packets.

The data bus 215 may include one or more conductors that connect the receiver 205, the transmitter 210, the IRC 245, and the external memory interface 265. The scheduler 220 may include logic that controls access to the external memory 170 by the queuing and dequeuing logic of the receiver 205 and transmitter 210, respectively. The multiport switch 180 is configured to operate as a non-blocking switch, where network data is received and transmitted from the switch ports at the respective wire rates of 10, 100, or 1000 Mb/s. Hence, the scheduler 220 may control the access by different ports to optimize use of the bandwidth of the external memory 170.

The flow control logic 225 may include logic that operates in conjunction with the buffer management logic 230, the PVQ 235, and the output control queues 240 to control the transmission of packets by the transmitter 210. The flow control logic 225 may control the transmitter 210 so that the transmitter 210 outputs packets in an efficient manner based on the volume of data traffic. The buffer management logic 230 may include logic that oversees the use of memory within the multiport switch 180. For example, the buffer management logic 230 may manage the use of frame pointers and the reuse of frame pointers once the data packet has been transmitted to its designated output port(s). Frame pointers identify the location of data frames stored in the external memory 170 that require transmission.

The PVQ 235 may include logic that obtains a frame pointer to the appropriate output queue(s) in output control queues 240 that correspond to the output ports to receive the data frame transmission. For multicopy frames, the PVQ 235 may supply multiple copies of the same frame pointer to more than one output queue. The output control queues 240 may include a FIFO-type output queue corresponding to each of the transmit modules in the transmitter 210. Each of the output queues may include multiple priority queues for frames having different levels of priority. For example, a high priority queue may be used for frames that require a lower access latency (e.g., frames for multimedia applications or management frames). The frame pointers stored in the FIFO-type output queues may be processed by the dequeuing logic for the respective transmit modules. The dequeuing logic uses the frame pointers to access the external memory 170 to read data frames at the memory locations specified by the frame pointers.

The IRC 245 may include an internal decision making engine that makes frame forwarding decisions for data packets that are received by the receiver 205. The IRC 245 may monitor (i.e., "snoop") the data bus 215 to determine the frame pointer value and a part of the data frame, for example, the header information of a received packet, including the source, destination, and virtual local area network (VLAN) address information. The IRC 245 may use the header information to determine which output port will output the data frame stored at the location specified by the frame pointer. The IRC 245 may, thus, determine that a given data frame should be output by either a single port (i.e., unicast), multiple ports (i.e., multicast), all ports (i.e., broadcast), or no port (i.e., discarded).

For example, each data frame may include a header that identifies the source and destination addresses. The IRC 245 may use the destination address to identify the appropriate output port to output the data frame. The frame header may also include VLAN address information that identifies the frame as information destined to one or more members of a group of network stations 110. The IRC 245 may alternatively determine that a data frame should be transferred to another multiport switch 180 via the expansion port. Therefore, the IRC 245 determines whether a frame temporarily stored in the external memory 170 should be output to a single output port, multiple output ports, no output port, or another multiport switch 180.

The IRC 245 may output its forwarding decision to the PVQ 235 in the form of a forwarding descriptor. The forwarding descriptor may include, for example, a priority class identifying whether the data frame is high priority or low priority, a port vector identifying each output port that should transmit the frame, the input port number, or VLAN information. The PVQ 235 may decode the forwarding descriptor to obtain the frame pointer. The PVQ 235 may then supply the frame pointer to the appropriate output queues within the output control queues 240.

The IRC 245 may also perform layer 3 filtering. For example, the IRC 245 may examine each received data packet for up to 128 programmable patterns and process the packet based on the result. The result may dictate that the IRC 245 drop the packet, forward the packet to the host 160, or assign a user priority or a Differentiated Services Code Point (DSCP) to the packet. User priorities and the DSCP may be independently mapped into output priority classes.

The registers 250 may include configuration and status registers used by the host interface 260. The MIB counters 255 may provide statistical network information in the form of MIB objects for use by the host 160. The host interface 260 may include a standard interface that permits an external management entity, such as the host 160, to control the overall operation of the multiport switch 180. The host interface 260 may decode host accesses within a prescribed register space and read and write configuration and status information to and from the registers 250.

The external memory interface 265 may include a standard interface that permits access to the external memory 170. The external memory interface 265 may permit external storage of packet data in the external memory 170 in a direct memory access (DMA) transaction during an assigned time slot determined by the scheduler 220. In an implementation consistent with the present invention, the external memory interface 265 operates at a clock frequency of at least 66 MHz and, preferably, at a frequency of 100 MHz or above.

The EEPROM interface 270 may include a standard interface to another external memory, such as an EEPROM. The LED interface 275 may include a standard interface to external LED logic. The LED interface 275 may send the status of conditions of the input and output ports to the external LED logic. The LED logic may drive LED display elements that are human-readable. The JTAG interface 280 may include a standard interface to external testing equipment to permit, for example, a boundary scan test to be performed on the multiport switch 180.

The foregoing description of the switch architecture provides an overview of the switch operations in a packet switched network. A more detailed description of the features of the present invention as embodied, for example, in the multiport switch 180 is provided below.

Selective Admission Control in a Network Device

The present invention is directed to an admission control mechanism in a network device, such as multiport switch 180. The multiport switch 180, consistent with the present invention, determines when to perform an admission control procedure based on information included in a received data frame and the availability of resources on the multiport switch 180.

Figure 3:
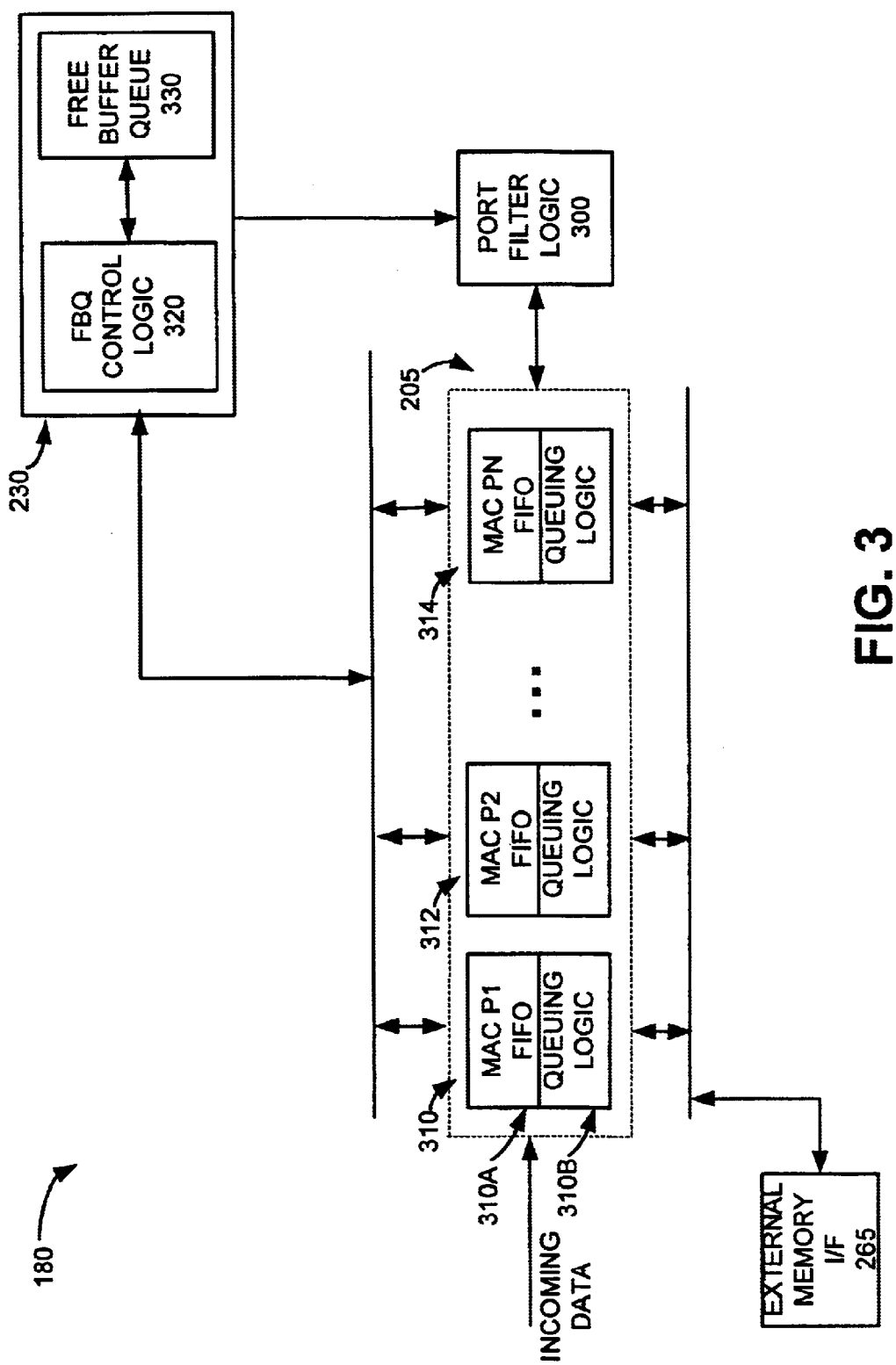
FIG. 3 is an exemplary detailed block diagram of a portion of the multiport switch of FIG. 2, consistent with an implementation of the present invention.

FIG. 3 illustrates a portion of multiport switch 180, consistent with an exemplary implementation of the present invention, in which selective admission control may be performed. Referring to FIG. 3, multiport switch 180 includes receiver 205, buffer management logic 230, external memory interface 265 and port filter logic 300.

The receiver 205 includes MAC modules labeled 310, 312 and 314 corresponding to input ports 1 through N, respectively. Each MAC module may include a receive FIFO buffer and queuing logic. For example, referring to FIG. 3, MAC module 310 includes a receive FIFO buffer, labeled 310A, and queuing logic 310B. The other MAC modules may similarly include receive FIFO buffers and queuing logic.

The buffer management logic 230 includes free buffer queue (FBQ) control logic 320 and free buffer queue 330. The FBQ 330 stores frame pointers that identify locations in external memory 170 that are available to store data frames. The FBQ control logic 320, consistent with the present invention, initiates admission control in multiport switch 180 when the number of available frame pointers in FBQ 330 falls below a predetermined threshold. The particular number of frame pointers left in the FBQ 330 before the FBQ control logic 320 initiates admission control may be set based on the user's requirements and may also be programmable by the user. That is, the user may program the number of frame pointers remaining in FBQ 330 before admission control is enabled, via host interface 260 (FIG. 2), for example, based on network conditions.

In an exemplary implementation consistent with the present invention, the FBQ 330 includes two separate "watermarks" (i.e., thresholds). Each watermark corresponds to a predetermined number of frame pointers remaining in the FBQ 330. The FBQ control logic 320 detects when the FBQ 330 reaches one of the respective watermarks and transmits an admission control signal to port filter logic 300, as described in more detail below.

The port filter logic 300, consistent with an exemplary implementation of the present invention, determines a priority associated with a received data frame and also determines the type of data included in the received data frame, as described in more detail below. When admission control is enabled and the port filter logic 300 identifies a data frame as being of a certain priority and type, the port filter logic 300 may signal the appropriate MAC module to drop the data frame.

The port filter logic 300 is illustrated as being a separate component from the receiver 205. It should be understood that in alternative implementations of the present invention, the port filter logic 300 may be part of receiver 205. In another alternative, the functions performed by port filter logic 300 may be performed by another logic component, such as the respective queuing logic of the MAC modules.

In an exemplary implementation of the present invention, the port filter logic 300 categorizes data frames as having either a high priority or a low priority. A high priority frame may include a frame that requires lower access latency, such as a frame destined for a management device or a frame for a multimedia application. A low priority frame may include any other frame.

In alternative implementations of the present invention, the number of priorities associated with the data frames may be greater than two. For example, the port filter logic 300 may identify frames as having one of three levels of priority, such as low, medium and high. In another implementation, the port filter logic 300 may identify frames as having one of four levels of priority, such as low, low-medium, medium-high and high. In these cases, the number of watermarks in the FBQ 330 may correspond to the priority levels. For example, in a situation where the multiport switch 180 supports four levels of priority, the number of watermarks in the FBQ 330 may be four.

In addition, in some implementations of the present invention, the multiport switch 180 may receive data frames having a priority indication. For example, an Ethernet frame may include a three-bit field representing one of eight levels of priority. In this case, port filter logic 300 may map the received priority information to a corresponding priority level supported by the multiport switch 180. For example, the port filter logic 300 may map the eight levels of priority to either high or low priority on the multiport switch 180. Alternatively, the eight levels of priority associated with received data frames may be mapped to three or more levels of priority on the multiport switch 180, based on the levels of priority supported by the multiport switch 180.

Figure 4:
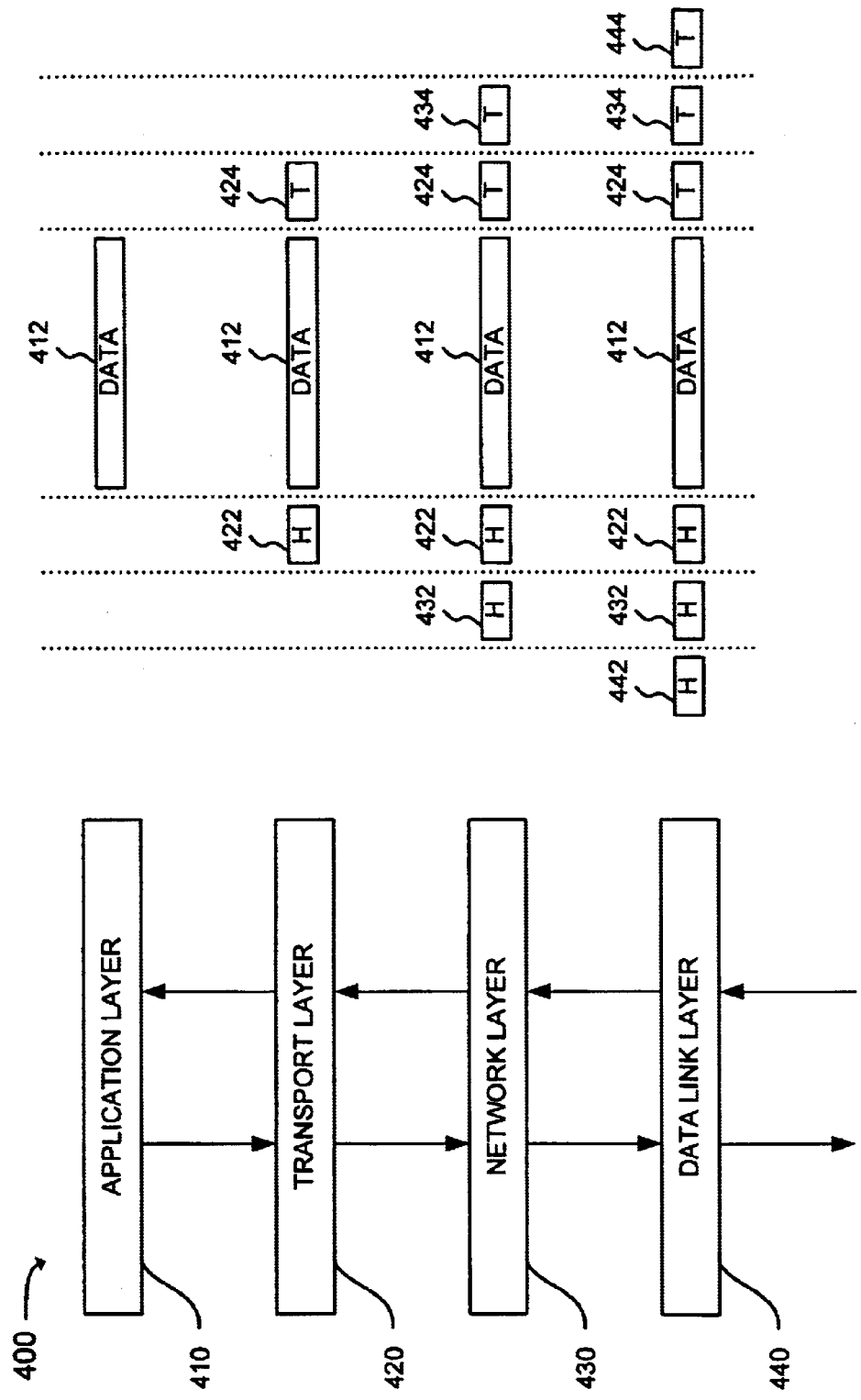
FIG. 4 is an exemplary diagram of a communications protocol used in an implementation consistent with the present invention.

The port filter logic 300 also identifies the type of data included in the data portion of the data frame. For example, FIG. 4 is an exemplary diagram of a communications protocol 400 that may be used by a network station 110 and network node 150 in an implementation consistent with the present invention. The communications protocol 400 includes an application layer 410, a transport layer 420, a network layer 430 and a data link layer 440. The application layer 410 may include the applications or programs that initiate the communication. The application layer 410 may include several application layer protocols, such as protocols for mail, file transfer, remote access, authentication, and name resolution. The application layer 410 may deliver data 412 to the network 100 by passing a data packet to the transport layer 420 along with the destination of the packet.

The transport layer 420 may establish a virtual circuit, a connection, or a socket between the source and destination of the packet. The transport layer 420 may attach a header 422 and trailer 424 onto the packet in accordance with the specifications of the relevant transport protocol. The transport layer 420 passes the packet to the network layer 430 along with the Internet Protocol (IP) address of the destination.

The network layer 430 may accept the packet from the transport layer 420 and prepare the packet for the data link layer 440 by converting the IP address into a physical address, such as a MAC address, and fragmenting the packet, if necessary, into the required sizes. The network layer 430 may generate packets called datagrams by attaching an IP header 432 and trailer 434 onto the packets from the transport layer 420 in accordance with the specifications of the relevant protocol. The network layer 430 passes the datagram to the data link layer 440.

The data link layer 440 may include a data link protocol, such as Ethernet, that is responsible for reliably moving the data across the network 100. The data link layer 440 converts the datagram into its own format, which may include adding a header 442 that includes source and destination MAC addresses and a trailer 444 that includes checksum data.

Figure 5:
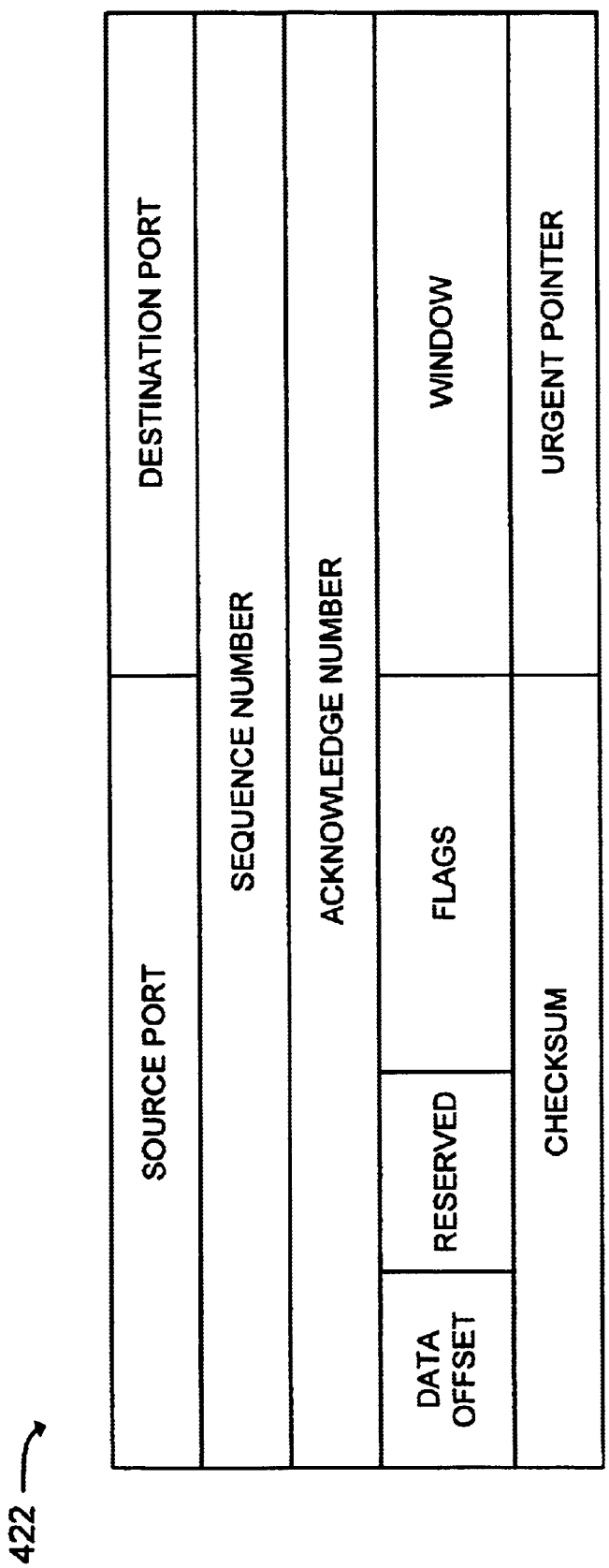
FIGS. 5–7 are exemplary detailed diagrams of the headers of FIG. 4, consistent with an implementation of the present invention.
Figure 6:
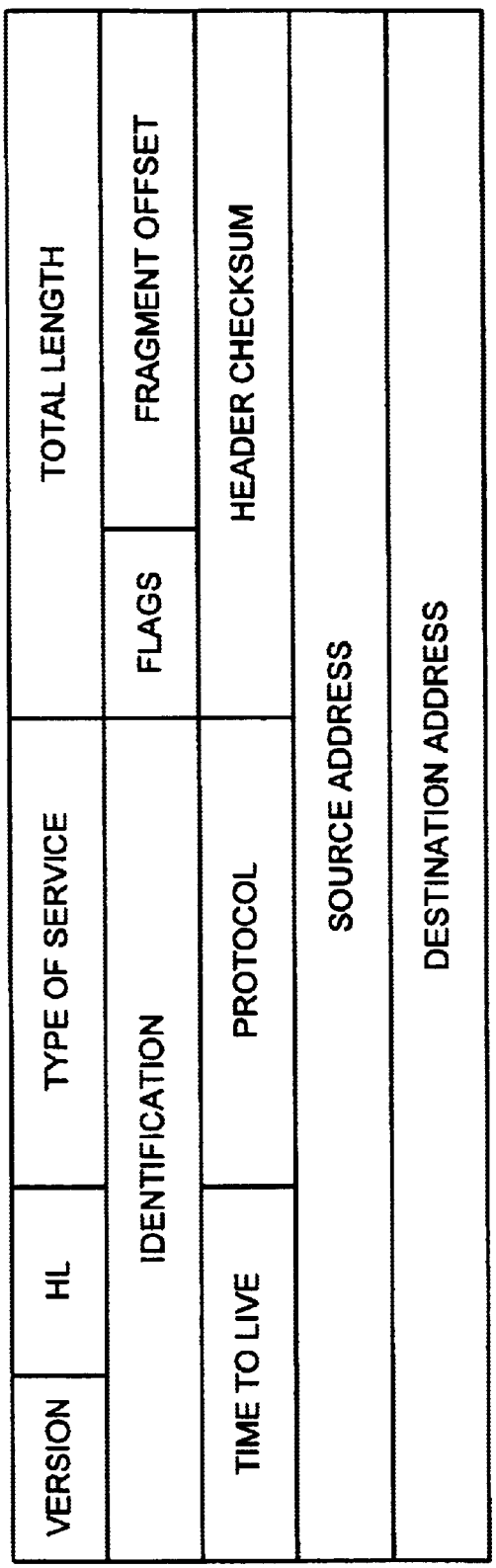
Figure 7:

FIGS. 5–7 are detailed diagrams of the headers 422–442, respectively, in an implementation consistent with the present invention. As shown in FIG. 5, the header 422 includes a source port field, a destination port field, a sequence number field, an acknowledge number field, a data offest field, a reserved field, a flags field, a window field, a checksum field and an urgent pointer field. The source port and destination port fields include data that identify the source and destination of a data packet. The sequence number field includes data used to assure the order and delivery of the packet at the destination. The acknowledge number field includes data that identifies the next byte of data that the source expects to receive from the destination.

The data offset field includes data that identifies the length of the header 422. The reserved field may be used for future expansions. The flags field may include several flags, such as urgent, acknowledge, push, reset, synchronize, and finish flags. The urgent flag indicates whether the data in the urgent pointer field is valid. The acknowledge flag indicates whether the data in the acknowledgement number field is valid. The push flag indicates whether the accompanying data should be passed to the application at the destination in an expedited manner. The reset flag indicates whether the connection should be reset. The synchronize (SYN) flag is used to establish an initial agreement on the sequence numbers. The finish (FIN) flag indicates whether the source has finished sending data.

The window field includes data that identifies the amount of space the destination has available for storage of unacknowledged data. The checksum field includes a checksum value that may cover both the header 422 and the data 412. The urgent pointer field includes data that identifies whether this packet should take priority over the normal data stream.

Referring to FIG. 6, the header 432 includes a version field, a header length field, a type of service field, a total length field, an identification field, a flags field, a fragment offset field, a time to live field, a protocol field, a header checksum field, a source address and a destination address. The version field includes data that identifies the version of the protocol being used. The header length field includes data that identifies the length of the header 432. The type of service field includes data that identifies the quality of service to be given to the datagram by the network 100.

The total length field includes data that identifies the length of the datagram (i.e., the headers 422 and 432 and data 412). The identification field includes data used to reassemble a fragmented datagram at the destination. The flags field may include one or more flags that identify, for example, whether the datagram may be fragmented. The fragment offset field includes data that identifies the starting point in relation to the start of the original sent packet.

The time to live field includes a count value that identifies the number of hops/links over which the packet may be routed. The protocol field includes data that identifies the type of transport protocol (e.g., Internet Control Message Protocol (ICMP), Internet Group Management Protocol (IGMP), Transmission Control Protocol, or User Datagram Protocol (UDP)) to be used on the datagram at the destination. The header checksum field includes a checksum value that covers the header 432. The source and destination address fields include addresses, such as Internet addresses, of the source and destination, respectively.

Referring to FIG. 7, the header 442 includes a destination address field, a source address field and a type/length code field. In an exemplary implementation of the present invention, the source and destination address fields include Ethernet addresses for the source and destination, respectively. The type/length code field includes data that identifies the data link protocol used to connect the source and destination and also includes data that identifies the length of the data frame. As described previously, the header 442 may also include a priority field indicating a priority associated with the data frame. In addition, the header 442 may include virtual local area network (VLAN) information.

The port filter logic 300 may identify the type of data frame based on information included in the payload portion of a received data frame. It should be understood that the payload portion of the data frame includes headers 422 and 432, data 412 and trailers 424 and 434 (FIG. 4). For example, the payload portion of the data frame may include information relating to a transmission control protocol (TCP) session. In an exemplary TCP session, the data conversation between two devices, such as between two network stations 110 or between a network station 110 and a network node 150, may be divided into three kinds of packets: 1) setup packets; 2) data packets; and 3) disconnect packets. A setup packet may be identified when the SYN flag of the TCP header is set. In other words, a set SYN flag in the flag field of header 422 (FIG. 4) indicates that the payload portion of the packet is associated with setting up a connection between two devices. In a typical scenario, a source device, such as a network station 110, first sends a setup packet that includes an initial sequence number (ISN_CLIENT). This sequence number identifies the particular data in a stream of data. The destination device, such as network node 150, typically sends an acknowledgement packet back to the source that acknowledges the client's sequence number and includes the server's initial sequence number (ISN_SERVER). The source device may then respond with a packet that acknowledges the server's sequence number.

After these setup packets establish the connection, one or more data packets may follow with the actual data conversation between the two devices. A disconnect packet follows the data packet(s) and may be identified when the FIN flag of the TCP header is set. In other words, a set FIN flag in the flag field of header 422 indicates that the source has finished sending data and effectively ends the TCP session.

The port filter logic 300, consistent with the present invention, may identify a setup packet based on the value of the SYN flag in the flag field of header 422. The port filter logic 300 may selectively drop setup packets when congestion conditions occur, as described in more detail below.

Figure 8:
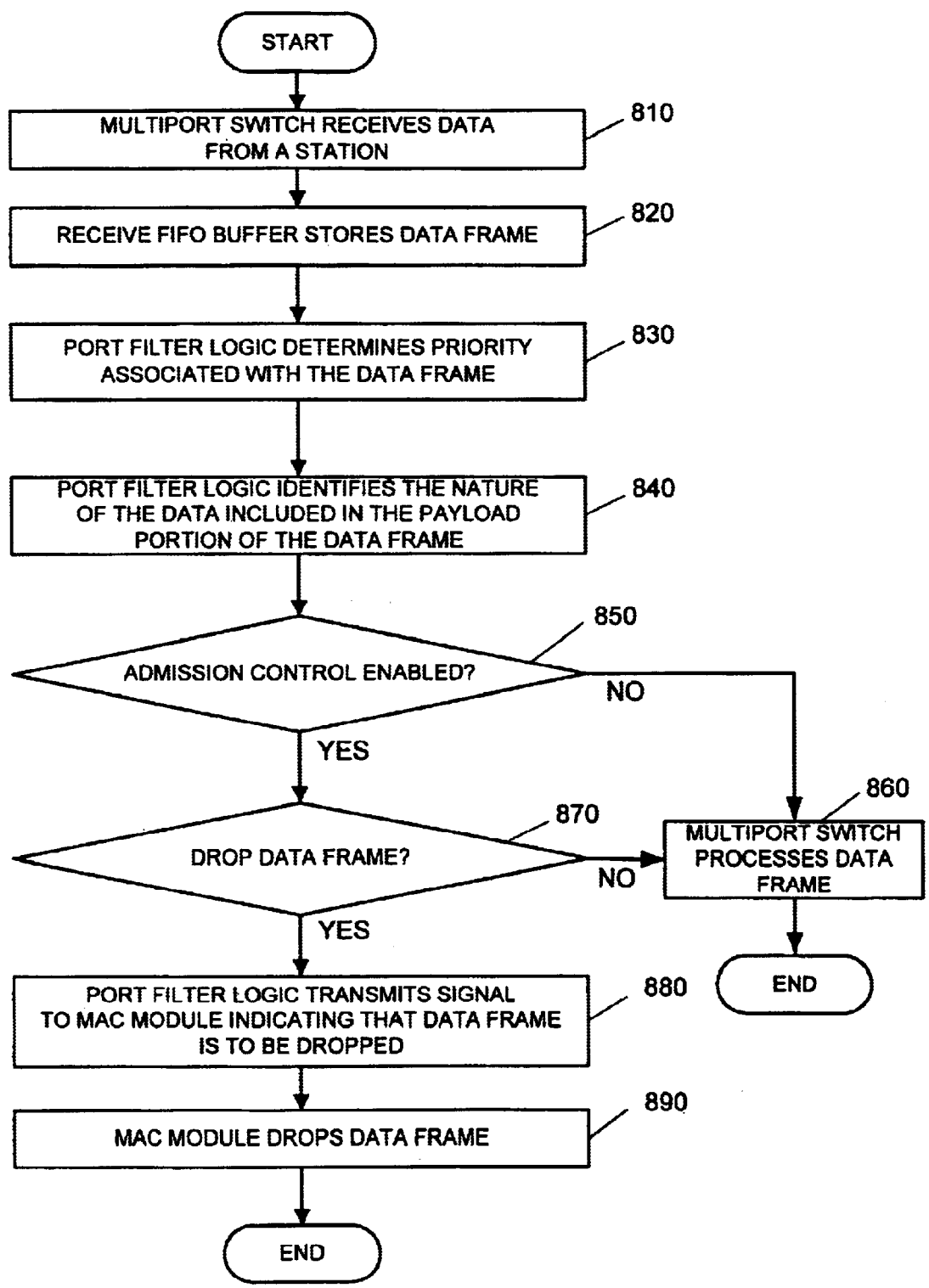
FIG. 8 is a flow diagram illustrating processing performed by the multiport switch of FIG. 2, according to an exemplary implementation consistent with the present invention.

FIG. 8 illustrates exemplary processing by multiport switch 180 in an implementation consistent with the present invention. Processing may begin upon start-up of network 100 (FIG. 1). Assume that a network station 110 transmits a data frame and multiport switch 180 receives the data frame [step 810]. For example, assume that MAC module 310 receives the data frame. In this case, receive FIFO buffer 310A stores the data frame [step 820].

The port filter logic 300 examines a portion of the received data frame and determines the priority associated with the received data frame [step 830]. In an exemplary implementation of the present invention, the port filter logic 300 examines the header of the received data frame (i.e., header 442, FIG. 4) while the data frame is being stored in the receive FIFO buffer 310A.

As described previously, the port filter logic 300 may identify the priority based on the type of frame or the destination of the frame. For example, a data frame for a multimedia application or a data frame destined for a management device may be designated as a high priority frame. All other data frames may be designated as low or normal priority frames. Alternatively, the port filter logic 300 may identify the priority based on any other criteria, such as the particular user's requirements. In another implementation, the port filter logic 300, as described previously, may identify the priority based on priority information transmitted with the data frame. In this situation, the port filter logic 300 may map the received priority information to a corresponding priority level supported by the multiport switch 180.

In any event, in addition to identifying the priority associated with the data frame, port filter logic 300 determines the nature of the data included in the payload portion of the data frame [step 840]. For example, the port filter logic 300 may determine whether the data frame is associated with establishing a new connection with another device. As described previously, the Ethernet frame may include in its payload portion, a header for a TCP packet (i.e., header 422, FIG. 5) that identifies the corresponding data (i.e., data 412, FIG. 4) as being a setup packet that is involved in setting up a TCP session, e.g., synchronizing sequence numbers. In this case, the SYN flag in the flags field of header 422 may be set. It should also be noted that the acknowledge flag in the flags field of header 422 may also be set when the packet is associated with acknowledging sequence numbers between devices.

Assume that the port filter logic 300 identifies the data as being a setup packet (e.g., the SYN flag is set). In this case, the port filter logic 300 may then determine whether admission control is enabled [step 850]. In an exemplary implementation, the port filter logic 300 determines whether admission control is enabled based on whether a signal from FBQ control logic 320 is asserted. For example, assume that FBQ control logic 320 determines that the number of available frame pointers in FBQ 330 is below a first watermark. In this case, FBQ control logic 320 transmits an enable admission control signal, such as ADMISSION_CONTROL_LOW, to port filter logic 300. This may indicate that port filter logic 300 should perform an admission control procedure on selected low priority data frames.

If admission control is not enabled, the multiport switch 180 processes the data frame [step 860]. That is, in the example above, the queuing logic 310B accesses the FBQ 330 to obtain a frame pointer identifying a location in external memory 170 and transfers the data frame stored in receive FIFO buffer 310A and the frame pointer to external memory interface 265. The external memory interface 265 then transfers the data frame to the location in external memory 170 identified by the frame pointer. The multiport switch 180 then processes the data frame to generate frame forwarding information, retrieves the data frame from external memory 170 and forwards the data frame to its intended destination(s).

If the port filter logic 300 determines that admission control is enabled, the port filter logic 300 determines whether the data frame is to be dropped [step 870]. In an exemplary implementation of the present invention, the port filter logic 300 determines whether the data frame is to be dropped based on the priority of the data frame and the identified type of data included in the payload of the data frame. For example, when port filter logic 300 identifies a data frame as having a low priority and admission control for low priority frames is enabled, the port filter logic 300 may drop frames that include setup packets. By dropping setup packets, the multiport switch 180 may allow data transmissions associated with "earlier" TCP sessions (i.e., session in which the setup portion of the TCP session has already been completed), to be completed without having to drop these data conversations.

If the congestion condition remains for a predetermined period (i.e., the FBQ 330 remains below the first watermark), the multiport switch 180 may drop all low priority data frames. However, by allowing setup packets to be dropped first, the multiport switch 180 may selectively give earlier TCP sessions a chance to be completed. In addition, since the setup packet is dropped, the destination device does not transmit an acknowledgement setup packet back to the source via the multiport switch 180 and the source device does not send the acknowledgement setup packet back to the destination device. This may further aid in reducing congestion on the multiport switch 180.

In alternative implementations, the port filter logic 300 may determine that data frames of other priorities are to be dropped when admission control is enabled, based on the user's requirements. For example, assume that FBQ control logic 320 determines that the number of available frame pointers in FBQ 330 is below a second watermark. In this case, FBQ control logic 320 may transmit an enable admission control signal, such as ADMISSION_CONTROL_HIGH, to port filter logic 300. This may indicate that port filter logic 300 is to drop all low priority frames and selected high priority frames. That is, the port filter logic 300 identifies the nature of the data included in the payload portion of the data frame [step 840] and then determines whether to drop the high priority data frame [step 870]. For example, if the high priority data frame is identified as including a setup packet, the multiport switch 180 may drop the data frame. The multiport switch 180, however, may process data packets other than the setup packets to enable an existing TCP session to complete. As described previously, by dropping setup packets the multiport switch 180 may further reduce data traffic on the network since acknowledgement packets and other packets associated with establishing the TCP session will not be transmitted. Once again, if the congestion condition persists, the port filter logic 300 may drop all received data frames, including high priority data frames.

In summary, the port filter logic 300 may decide to drop data frames based on the status of the FBQ 330 and the nature of the data included in the data frame. The port filter logic 300 may be configured to examine a portion or all of the data frame to determine the nature of the data packet. That is, in the example above, the port filter logic 300 may be configured to identify the status of one or more of the flags in header 422 to identify the nature of a data packet.

If the port filter logic 300 decides to drop the data frame, the port filter logic 300 transmits a signal to the corresponding MAC module that received the data frame [step 880]. In the example above, the port filter logic 300 transmits a signal to MAC module 310 indicating that the data frame is to be dropped. In an exemplary implementation, the port filter logic 300 may transmit a signal to the MAC module indicating that the data frame is a "runt" (i.e., an incomplete data frame or a data frame that contains an error), even though the data frame is not actually a runt. In this situation, the MAC module may be configured to recognize that a runt frame is to be dropped. This advantageously simplifies the logic of the MAC modules since the MAC module may already be configured to drop frames identified as runts. Alternatively, the port filter logic 300 may transmit any other signal (e.g., DROP_FRAME) indicating that the data frame is to be dropped.

In any event, the MAC module 310 receives the signal from the port filter logic 300 and drops the data frame [step 890]. In this case, the queuing logic 310B deletes the data frame from the receive FIFO buffer 310A. Advantageously, the data frame is dropped at the "front end" of the multiport switch 180 (i.e., early in the processing) without using a significant amount of resources of the multiport switch 180. For example, the queuing logic 310B does not obtain a frame pointer from FBQ 330 and does not forward the data frame to external memory interface 265. This saves considerable processing time associated with obtaining a frame pointer and then returning the frame pointer to the FBQ 330. In other words, the multiport switch 180 stops all processing related to forwarding that particular data frame to its intended destination.

Described has been an apparatus and method for performing selective admission control in a network device. One advantage of the present invention is that the multiport switch 180 can selectively drop data frames when admission control is enabled. Another advantage of the present invention is that the multiport switch 180 may drop frames associated with setting up a connection between two devices, thereby enabling earlier sessions a chance to complete. A further advantage of the present invention is that the multiport switch 180 may determine whether to drop a received data frame relatively early in the processing of the data frame. This enables the multiport switch to avoid using resources for a data frame that will later be dropped, thereby increasing overall data throughput.

Only the preferred embodiments of the invention and a few examples of its versatility are shown and described in the present disclosure. It is to be understood that the invention is capable of use in various other combinations and environments and is capable of modifications within the scope of the inventive concept as expressed herein.

For example, the present invention has been described mainly in relation to dropping data frames based on whether the data frame includes a setup packet associated with a TCP session between two devices. The present invention may also be used in situations where other criteria may be used to determine whether to drop data frames. That is, the port filter logic 300 may be configured to detect any other condition associated with the payload portion of the data frame and drop the data frame based on the user's requirements.

In addition, the present invention has been described in conjunction with determining a priority associated with the data frame and deciding whether to drop the data frame based on the priority of the data frame and whether the data frame includes a setup packet. The present invention may also be used in situations where the priority of the data frame is not used to determine whether to drop the data frame. That is, the port filter logic 300 may determine whether to drop a data frame based on whether the data frame includes a setup packet and the availability of frame pointers in the FBQ 330, regardless of a priority associated with the data frame.

Lastly, the present invention has been described mainly in relation to a first and second watermark in the FBQ 330 corresponding to low and high priority admission control thresholds. However, it should be understood that the present invention may also be used in a situation in which the FBQ 330 includes any number of watermarks, as described previously. In this situation, the multiport switch 180 initially drops the setup packets of data frames having a priority corresponding to the level reached in the FBQ 330. In other words, if the FBQ includes four watermarks and the second watermark corresponds to low-medium priority data frames, the multiport switch 180 would drop low-medium priority data frames that include setup packet information.

What is claimed is:

1. A network device configured to control communication of data frames between stations, comprising:
   a plurality of receive ports configured to receive data frames from the stations; and
   data frame processing logic configured to:
      determine whether admission control is enabled,
      determine a priority associated with each of the received data frames,
      determine a type associated with each of the received data frames based on information included in a payload portion of the received data frames, and
      determine whether to drop a first one of the received data frames based on whether admission control is enabled, the priority of the first data frame and the type associated with the first data frame.

2. The network device of claim 1, wherein when determining a type associated with the first data frame, the data frame processing logic is configured to:
   identify whether the first data frame is associated with setting up a connection between a first device and a second device.

3. The network device of claim 2, wherein the data frame processing logic is further configured to:
   drop the first data frame when the first data frame is associated with setting up a connection between the first device and second device and the priority of the first data frame is low.

4. The network device of claim 2, wherein when identifying whether the first data frame is associated with setting up a connection between a first device and a second device, the data frame processing logic is configured to:
   read at least a portion of the first data frame to determine whether the first data frame includes a transmission control protocol message including sequence number information.

5. A network device configured to control communication of data frames between stations, comprising:
   a plurality of receive ports configured to receive data frames from the stations;
   data frame processing logic configured to:
      determine whether admission control is enabled, and
      determine whether to drop one of the received data frames based on whether admission control is enabled and information included in the received data frame;
   a buffer configured to store address pointers corresponding to locations in an external memory available for storing data frames; and
   buffer control logic configured to:
      detect when a number of the address pointers in the buffer reaches a first threshold, and
      transmit a signal to the data frame processing logic, in response to detecting the first threshold, indicating that admission control is enabled.

6. The network device of claim 5, wherein the signal indicates that admission control is enabled for data frames corresponding to a first priority.

7. The network device of claim 6, wherein the data frame processing logic is further configured to:
   drop one or more of the received data frames, corresponding to the first priority, associated with establishing a connection between two devices.

8. The network device of claim 1, wherein when determining whether to drop the first data frame, the data frame processing logic is configured to:
   detect whether the first data frame includes a transmission control protocol header in which the synchronize flag is set.

9. The network device of claim 8, further comprising:
   a plurality of receive buffers corresponding to the plurality of receive ports, the plurality of receive buffers configured to store the received data frames, the data frame processing logic being further configured to:
      delete the first data frame from a first one of the plurality of receive buffers when the synchronize flag in the first data frame is set.

10. In a network device that controls communication of data frames between stations, a method comprising:
    receiving data frames from the stations;
    determining a priority associated with a first one of the data frames;
    determining whether the first data frame is associated with establishing a connection between a first device and a second device;
    determining whether to drop the first data frame based on whether the first data frame is associated with establishing the connection and the priority of the first data frame; and
    dropping the first data frame when the first data frame is associated with establishing the connection and the priority corresponds to a first priority.

11. The method of claim 10, wherein the determining whether the first data frame is associated with establishing the connection includes:
    detecting whether the first data frame includes a transmission control protocol message in which a synchronize flag is set.

12. In a network device that controls communication of data frames between stations, a method comprising:

receiving data frames from the stations;

determining whether a first data frame is associated with establishing a connection between a first device and a second device;

determining whether a resource associated with processing data frames is below a first threshold; and determining whether to drop the first data frame, when the first data frame is associated with establishing the connection, based on whether the resource is below the first threshold.

13. In a network device that controls communication of data frames between stations, a method comprising:

receiving data frames from the stations;

determining whether a first data frame is associated with establishing a connection between a first device and a second device;

detecting when a number of address pointers reaches a first threshold, the address pointers corresponding to locations in an external memory for storing the received data frames; and initiating admission control for data frames having a first priority when the first threshold is detected.

14. The method of claim 13, further comprising:

determining a priority associated with the first data frame; and determining whether to drop the first data frame, when the first data frame is associated with establishing the connection and the priority of the first data frame corresponds to the first priority.

15. The method of claim 10, further comprising:

storing the received data frames in at least one buffer, and wherein the dropping includes:

deleting the first data frame from the at least one buffer.

16. A network device configured to control communication of data frames in a network, comprising:

a plurality of receive ports configured to receive data frames; and processing logic configured to:

detect a congestion condition associated with processing the data frames, determine whether a data frame is associated with setting up a connection between two devices, determine whether to drop the data frame based at least in part on whether the data frame is associated with setting up a connection between two devices, and selectively drop data frames associated with setting up a connection between two devices based on a priority associated with the respective data frames.

17. The network device of claim 16, wherein when determining whether a data frame is associated with setting up a connection between two devices, the processing logic is configured to:

read at least a portion of the data frame to determine whether the data frame includes a transmission control protocol message including sequence number information.

18. The network device of claim 1, wherein at least some of the received data frames include priority information and the data frame processing logic is further configured to:

map the priority information included with the data frames to at least one of a high priority and low priority.

19. The network device of claim 5, wherein the buffer control logic is further configured to:

detect when the number of address pointers in the buffer reaches at least one other threshold, and transmit a second signal to the data frame processing logic, in response to detecting a particular one of the at least one other threshold, wherein the second signal indicates that admission control is enabled for data frames corresponding to the particular threshold.

20. The network device of claim 19, wherein the at least one other threshold comprises two thresholds.

* * * * *